United States Patent
Lee

(10) Patent No.: US 10,386,612 B2
(45) Date of Patent: Aug. 20, 2019

(54) OPTICAL IMAGING SYSTEM

(71) Applicant: Samsung Electro-Mechanics Co., Ltd., Suwon-si (KR)

(72) Inventor: Tae Youn Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 15/887,253

(22) Filed: Feb. 2, 2018

(65) Prior Publication Data

US 2018/0157009 A1    Jun. 7, 2018

Related U.S. Application Data

(62) Division of application No. 15/187,918, filed on Jun. 21, 2016, now Pat. No. 9,952,409.

(30) Foreign Application Priority Data

Oct. 19, 2015   (KR) .......................... 10-2015-0145260

(51) Int. Cl.
  *G02B 13/18*   (2006.01)
  *G02B 9/62*    (2006.01)
  *G02B 13/00*   (2006.01)
  *H04N 5/225*   (2006.01)

(52) U.S. Cl.
  CPC .......... *G02B 13/0045* (2013.01); *G02B 9/62* (2013.01); *H04N 5/2254* (2013.01)

(58) Field of Classification Search
  CPC ....... G02B 13/0045; G02B 9/62; G02B 13/04
  USPC .......................... 359/713, 752, 756, 761, 762
  See application file for complete search history.

(56) References Cited

U.S. PATENT DOCUMENTS

| | | |
|---|---|---|
| 9,541,737 B2 | 1/2017 | Chen et al. |
| 2006/0087747 A1 | 4/2006 | Ohzawa et al. |
| 2012/0056976 A1 | 3/2012 | Lee et al. |
| 2014/0185141 A1 | 7/2014 | Lee et al. |
| 2014/0368931 A1 | 12/2014 | Noda et al. |
| 2014/0376107 A1 | 12/2014 | Son |
| 2015/0049393 A1 | 2/2015 | Park |
| 2015/0109691 A1 | 4/2015 | Ota |

(Continued)

FOREIGN PATENT DOCUMENTS

| | | |
|---|---|---|
| CN | 103913824 A | 7/2014 |
| CN | 104238074 A | 12/2014 |

(Continued)

OTHER PUBLICATIONS

Korean Office Action dated Apr. 24, 2017 in corresponding Korean Patent Application No. 10-2015-0145260 (8 pages in English, 6 pages in Korean).

(Continued)

*Primary Examiner* — William Choi
(74) *Attorney, Agent, or Firm* — NSIP Law

(57) ABSTRACT

There is provided an optical imaging system including a first lens, a second lens, a third lens, a fourth lens, a fifth lens, and a sixth lens. The first lens includes a negative refractive power and a concave object-side surface. The second lens includes a concave object-side surface. The fourth lens includes a negative refractive power. The sixth lens includes an inflection point formed on an image-side surface thereof. The first to sixth lenses are sequentially disposed from an object side toward an imaging plane.

15 Claims, 24 Drawing Sheets

(56) References Cited

U.S. PATENT DOCUMENTS

2015/0346461 A1* 12/2015 Chen .................. G02B 13/18
    348/373
2016/0170180 A1* 6/2016 Son .................. G02B 13/0045
    359/708

FOREIGN PATENT DOCUMENTS

| | | |
|---|---|---|
| CN | 104252031 A | 12/2014 |
| CN | 204129311 U | 1/2015 |
| CN | 104375259 A | 2/2015 |
| CN | 104375259 B | 2/2018 |
| CN | 104252031 B | 5/2018 |
| JP | 2006-119368 A | 5/2006 |
| JP | 2009-25380 A | 2/2009 |
| JP | 2014-44250 A | 3/2014 |
| KR | 10-2012-0025338 A | 3/2012 |

OTHER PUBLICATIONS

Chinese Office Action dated Jun. 29, 2018 in corresponding Chinese Patent Application No. 201610523179.8 (9 pages in English, 5 pages in Chinese).

* cited by examiner

| FIRST EMBODIMENT ||||||
|---|---|---|---|---|---|
| f = 2.25 | | F number = 1.85 | Θ = | 52.40 | |
| SURFACE NO. | | RADIUS OF CURVATURE | THICKNESS/ DISTANCE | FOCAL LENGTH | REFRACTIVE INDEX | ABBE NUMBER |
| 1 | FIRST LENS | -3.0620 | 0.3000 | -12.968 | 1.544 | 56.090 |
| 2 | | -5.5800 | 0.0900 | | | |
| 3 | SECOND LENS (STOP) | -2.6590 | 0.2540 | 177.667 | 1.643 | 22.400 |
| 4 | | -2.6970 | 0.0760 | | | |
| 5 | THIRD LENS | 1.6470 | 0.7680 | 1.686 | 1.544 | 56.090 |
| 6 | | -1.7470 | 0.0680 | | | |
| 7 | FOURTH LENS | 13.5880 | 0.2400 | -3.220 | 1.651 | 21.490 |
| 8 | | 1.8200 | 0.3570 | | | |
| 9 | FIFTH LENS | 7870.6487 | 0.6000 | 2.648 | 1.544 | 56.090 |
| 10 | | -1.4470 | 0.3940 | | | |
| 11 | SIXTH LENS | 14.6890 | 0.3300 | -1.975 | 1.544 | 56.090 |
| 12 | | 0.9970 | 0.1530 | | | |
| 13 | FILTER | infinity | 0.1100 | | 1.517 | 64.200 |
| 14 | | infinity | 0.2800 | | | |
| 15 | IMAGING PLANE | infinity | 0.0300 | | | |

FIG. 3

| FIRST EMBODIMENT | K | A | B | C | D | E | F | G | H |
|---|---|---|---|---|---|---|---|---|---|
| 1 | -1.03784 | -0.11155 | 0.46803 | -0.86819 | 1.09096 | -0.87838 | 0.39190 | -0.07348 | 0.00000 |
| 2 | -1.00000 | -0.04429 | 0.79017 | -2.65508 | 5.43600 | -6.76563 | 4.46552 | -1.19309 | 0.00000 |
| 3 | -26.37140 | 0.14610 | -0.09556 | -1.41420 | 4.94018 | -7.90702 | 6.50189 | -2.16195 | 0.00000 |
| 4 | -77.98175 | 0.08280 | -1.01129 | 3.89498 | -9.07618 | 13.52529 | -11.37669 | 4.36545 | 0.00000 |
| 5 | -4.14224 | 0.33341 | -2.55067 | 11.35996 | -32.38804 | 56.69608 | -55.13875 | 22.79649 | 0.00000 |
| 6 | 2.18521 | -0.09134 | 0.41723 | -0.08702 | -3.06962 | 8.41703 | -9.01774 | 3.60893 | 0.00000 |
| 7 | 15.08777 | -0.32753 | 1.23819 | -2.73324 | 2.67398 | 0.39875 | -2.61081 | 1.34071 | 0.00000 |
| 8 | 0.07919 | -0.22668 | 0.66859 | -0.97114 | 0.28414 | 1.13126 | -1.43422 | 0.52438 | 0.00000 |
| 9 | 15.53147 | -0.03726 | -0.16412 | 0.65632 | -1.40977 | 2.12366 | -1.91819 | 0.93568 | -0.19551 |
| 10 | -4.16643 | -0.16669 | 0.14420 | -0.77169 | 2.48675 | -4.11056 | 3.76166 | -1.74773 | 0.31869 |
| 11 | -22786.905 | -0.56077 | -0.06019 | 1.02918 | -1.38920 | 0.96182 | -0.36695 | 0.07172 | -0.00549 |
| 12 | -4.10259 | -0.38099 | 0.40561 | -0.31617 | 0.17153 | -0.06371 | 0.01495 | -0.00194 | 0.00010 |

FIG. 4

| SECOND EMBODIMENT | | | | | |
|---|---|---|---|---|---|
| f = 2.25 | | F number = 1.87 | θ = 49.60 | | |
| SURFACE NO. | | RADIUS OF CURVATURE | THICKNESS/ DISTANCE | FOCAL LENGTH | REFRACTIVE INDEX | ABBE NUMBER |
| 1 | FIRST LENS | -3.0670 | 0.2850 | -14.350 | 1.544 | 56.090 |
| 2 | | -5.2030 | 0.0890 | | | |
| 3 | SECOND LENS (STOP) | -2.5740 | 0.2610 | -196.795 | 1.651 | 21.490 |
| 4 | | -2.7320 | 0.0870 | | | |
| 5 | THIRD LENS | 1.6320 | 0.7650 | 1.682 | 1.544 | 56.090 |
| 6 | | -1.7550 | 0.0730 | | | |
| 7 | FOURTH LENS | 11.6420 | 0.2810 | -3.183 | 1.651 | 21.490 |
| 8 | | 1.7580 | 0.3800 | | | |
| 9 | FIFTH LENS | -29.6990 | 0.6000 | 2.596 | 1.544 | 56.090 |
| 10 | | -1.3640 | 0.3620 | | | |
| 11 | SIXTH LENS | 6.4060 | 0.3300 | -1.959 | 1.544 | 56.090 |
| 12 | | 0.9010 | 0.1520 | | | |
| 13 | FILTER | infinity | 0.1100 | | 1.517 | 64.200 |
| 14 | | infinity | 0.2800 | | | |
| 15 | IMAGING PLANE | infinity | 0.0290 | | | |

FIG. 7

| SECOND EMBODIMENT | K | A | B | C | D | E | F | G | H |
|---|---|---|---|---|---|---|---|---|---|
| 1 | -1.10125 | -0.07650 | 0.23868 | -0.21699 | 0.07037 | 0.03090 | -0.03884 | 0.01105 | 0.00000 |
| 2 | -1.00000 | 0.05161 | -0.04564 | 0.35086 | -0.59911 | 0.32790 | -0.04840 | -0.00004 | 0.00000 |
| 3 | -25.71634 | 0.22538 | -0.98362 | 2.38015 | -3.83582 | 3.92909 | -2.18599 | 0.48648 | 0.00000 |
| 4 | -77.98175 | 0.06886 | -0.85496 | 3.25985 | -7.45027 | 10.84937 | -8.70048 | 3.01426 | 0.00000 |
| 5 | -4.52114 | 0.32489 | -2.20446 | 8.91941 | -23.69744 | 37.97329 | -33.31323 | 11.88577 | 0.00000 |
| 6 | 2.31644 | -0.10795 | 0.77686 | -2.51010 | 4.99396 | -6.27723 | 4.69841 | -1.59338 | 0.00000 |
| 7 | 15.08777 | -0.31722 | 1.27708 | -3.59025 | 6.61321 | -7.91330 | 5.65930 | -1.80976 | 0.00000 |
| 8 | 0.14858 | -0.22689 | 0.70458 | -1.38568 | 1.98486 | -2.02142 | 1.31871 | -0.39953 | 0.00000 |
| 9 | 15.53147 | -0.03770 | -0.18683 | 0.77183 | -1.86282 | 2.91265 | -2.55846 | 1.17196 | -0.22679 |
| 10 | -4.31541 | -0.23450 | 0.54122 | -1.83797 | 4.33134 | -6.29493 | 5.42305 | -2.45319 | 0.44322 |
| 11 | -22786.905 | -0.90739 | 1.35371 | -1.55102 | 1.32137 | -0.79860 | 0.33002 | -0.08150 | 0.00874 |
| 12 | -7.86848 | -0.28075 | 0.31893 | -0.26319 | 0.14415 | -0.05286 | 0.01205 | -0.00149 | 0.00007 |

FIG. 8

THIRD EMBODIMENT f = 2.25  F number = 1.85  θ = 52.90

| SURFACE NO. | | RADIUS OF CURVATURE | THICKNESS/ DISTANCE | FOCAL LENGTH | REFRACTIVE INDEX | ABBE NUMBER |
|---|---|---|---|---|---|---|
| 1 | FIRST LENS | -3.2390 | 0.2420 | -13.292 | 1.544 | 56.090 |
| 2 | | -6.0000 | 0.1110 | | | |
| 3 | SECOND LENS (STOP) | -2.7030 | 0.2670 | -363.176 | 1.651 | 21.490 |
| 4 | | -2.8410 | 0.0500 | | | |
| 5 | THIRD LENS | 1.5850 | 0.7860 | 1.695 | 1.544 | 56.090 |
| 6 | | -1.8370 | 0.0620 | | | |
| 7 | FOURTH LENS | 12.0300 | 0.2530 | -3.239 | 1.651 | 21.490 |
| 8 | | 1.7950 | 0.3380 | | | |
| 9 | FIFTH LENS | -329.2090 | 0.6530 | 2.532 | 1.544 | 56.090 |
| 10 | | -1.3790 | 0.3730 | | | |
| 11 | SIXTH LENS | 15.4220 | 0.3300 | -2.048 | 1.544 | 56.090 |
| 12 | | 1.0360 | 0.1580 | | | |
| 13 | FILTER | infinity | 0.1100 | | 1.517 | 64.200 |
| 14 | | infinity | 0.2800 | | | |
| 15 | IMAGING PLANE | infinity | 0.0300 | | | |

FIG. 11

| THIRD EMBODIMENT | K | A | B | C | D | E | F | G | H |
|---|---|---|---|---|---|---|---|---|---|
| 1 | -1.03784 | -0.11155 | 0.46803 | -0.86819 | 1.09096 | -0.87838 | 0.39190 | -0.07348 | 0.00000 |
| 2 | -1.00000 | -0.04429 | 0.79017 | -2.65508 | 5.43600 | -6.76563 | 4.46552 | -1.19309 | 0.00000 |
| 3 | -26.37140 | 0.14610 | -0.09556 | -1.41420 | 4.94018 | -7.90702 | 6.50189 | -2.16195 | 0.00000 |
| 4 | -77.98175 | 0.08280 | -1.01129 | 3.89498 | -9.07618 | 13.52529 | -11.37669 | 4.36545 | 0.00000 |
| 5 | -4.14224 | 0.33341 | -2.55067 | 11.35996 | -32.38804 | 56.69608 | -55.13875 | 22.79649 | 0.00000 |
| 6 | 2.18521 | -0.09134 | 0.41723 | -0.08702 | -3.06962 | 8.41703 | -9.01774 | 3.60893 | 0.00000 |
| 7 | 15.08777 | -0.32753 | 1.23819 | -2.73324 | 2.67398 | 0.39875 | -2.61081 | 1.34071 | 0.00000 |
| 8 | 0.07919 | -0.22668 | 0.66859 | -0.97114 | 0.28414 | 1.13126 | -1.43422 | 0.52438 | 0.00000 |
| 9 | 15.53147 | -0.03726 | -0.16412 | 0.65632 | -1.40977 | 2.12366 | -1.91819 | 0.93568 | -0.19551 |
| 10 | -4.16643 | -0.16669 | 0.14420 | -0.77169 | 2.48675 | -4.11056 | 3.76166 | -1.74773 | 0.31869 |
| 11 | -22786.905 | -0.56077 | -0.06019 | 1.02918 | -1.38920 | 0.96182 | -0.36695 | 0.07172 | -0.00549 |
| 12 | -4.10259 | -0.38099 | 0.40561 | -0.31617 | 0.17153 | -0.06371 | 0.01495 | -0.00194 | 0.00010 |

FIG. 12

| FOURTH EMBODIMENT ||||||
|---|---|---|---|---|---|
| f = | 2.25 | F number = 1.85 | θ = | 51.80 | |
| SURFACE NO. | | RADIUS OF CURVATURE | THICKNESS/ DISTANCE | FOCAL LENGTH | REFRACTIVE INDEX | ABBE NUMBER |
| 1 | FIRST LENS | -3.0020 | 0.2950 | -14.117 | 1.544 | 56.090 |
| 2 | | -5.0860 | 0.0840 | | | |
| 3 | SECOND LENS (STOP) | -2.5920 | 0.2550 | -529.470 | 1.643 | 22.400 |
| 4 | | -2.7130 | 0.0790 | | | |
| 5 | THIRD LENS | 1.6370 | 0.7650 | 1.686 | 1.544 | 56.090 |
| 6 | | -1.7580 | 0.0710 | | | |
| 7 | FOURTH LENS | 11.2310 | 0.2480 | -3.234 | 1.651 | 21.490 |
| 8 | | 1.7730 | 0.3840 | | | |
| 9 | FIFTH LENS | infinity | 0.6000 | 2.549 | 1.544 | 56.090 |
| 10 | | -1.3930 | 0.3560 | | | |
| 11 | SIXTH LENS | 12.5610 | 0.3300 | -1.920 | 1.544 | 56.090 |
| 12 | | 0.9590 | 0.1570 | | | |
| 13 | FILTER | infinity | 0.1100 | | 1.517 | 64.200 |
| 14 | | infinity | 0.2800 | | | |
| 15 | IMAGING PLANE | infinity | 0.0300 | | | |

FIG. 15

| FOURTH EMBODIMENT | K | A | B | C | D | E | F | G | H |
|---|---|---|---|---|---|---|---|---|---|
| 1 | -1.19894 | -0.08311 | 0.28464 | -0.33449 | 0.22732 | -0.08423 | 0.00594 | 0.00355 | 0.00000 |
| 2 | -1.00000 | 0.02672 | 0.15316 | -0.20259 | 0.11593 | -0.10010 | 0.03362 | 0.00865 | 0.00000 |
| 3 | -25.98544 | 0.20423 | -0.76003 | 1.58180 | -2.46410 | 2.66050 | -1.54727 | 0.34186 | 0.00000 |
| 4 | -77.98175 | 0.06921 | -0.82523 | 3.10008 | -7.20949 | 10.85316 | -8.98539 | 3.22059 | 0.00000 |
| 5 | -4.58031 | 0.33250 | -2.28361 | 9.36292 | -25.44147 | 42.02065 | -38.33619 | 14.44361 | 0.00000 |
| 6 | 2.33683 | -0.08385 | 0.59334 | -1.70987 | 2.70212 | -2.44529 | 1.33141 | -0.39063 | 0.00000 |
| 7 | 15.08777 | -0.31458 | 1.25048 | -3.33061 | 5.40043 | -5.33687 | 3.13952 | -0.87512 | 0.00000 |
| 8 | 0.14122 | -0.23117 | 0.70837 | -1.25371 | 1.35308 | -0.85030 | 0.34213 | -0.09374 | 0.00000 |
| 9 | 15.53147 | -0.05160 | -0.01960 | -0.03999 | 0.24536 | -0.25273 | 0.16241 | -0.07497 | 0.01154 |
| 10 | -4.43024 | -0.18732 | 0.31001 | -1.23385 | 3.20107 | -4.83169 | 4.25423 | -1.95005 | 0.35489 |
| 11 | -22786.905 | -0.71567 | 0.58036 | -0.24138 | 0.08062 | -0.07736 | 0.07362 | -0.03071 | 0.00451 |
| 12 | -5.90904 | -0.30969 | 0.33289 | -0.27091 | 0.15211 | -0.05776 | 0.01365 | -0.00176 | 0.00009 |

FIG. 16

| FIFTH EMBODIMENT | | | | | |
|---|---|---|---|---|---|
| f = | 2.26 | F number = | 1.83 | θ = | 47.40 |
| SURFACE NO. | | RADIUS OF CURVATURE | THICKNESS/ DISTANCE | FOCAL LENGTH | REFRACTIVE INDEX | ABBE NUMBER |

| SURFACE NO. | | RADIUS OF CURVATURE | THICKNESS/ DISTANCE | FOCAL LENGTH | REFRACTIVE INDEX | ABBE NUMBER |
|---|---|---|---|---|---|---|
| 1 | FIRST LENS | -2.8270 | 0.2300 | -15.002 | 1.544 | 56.090 |
| 2 | | -4.4390 | 0.1260 | | | |
| 3 | SECOND LENS (STOP) | -2.5120 | 0.2280 | -217.028 | 1.643 | 22.400 |
| 4 | | -2.6480 | 0.1010 | | | |
| 5 | THIRD LENS | 1.6630 | 0.7870 | 1.600 | 1.589 | 61.250 |
| 6 | | -1.8100 | 0.0300 | | | |
| 7 | FOURTH LENS | 7.7280 | 0.2400 | -3.352 | 1.651 | 21.490 |
| 8 | | 1.6950 | 0.4480 | | | |
| 9 | FIFTH LENS | -9.7150 | 0.6000 | 2.793 | 1.544 | 56.090 |
| 10 | | -1.3480 | 0.2940 | | | |
| 11 | SIXTH LENS | 16.1760 | 0.3300 | -1.917 | 1.544 | 56.090 |
| 12 | | 0.9770 | 0.1460 | | | |
| 13 | FILTER | infinity | 0.1100 | | 1.517 | 64.200 |
| 14 | | infinity | 0.2800 | | | |
| 15 | IMAGING PLANE | infinity | 0.0300 | | | |

FIG. 19

| FIFTH EMBODIMENT | K | A | B | C | D | E | F | G | H |
|---|---|---|---|---|---|---|---|---|---|
| 1 | -0.35470 | -0.07055 | 0.18750 | -0.15673 | 0.06339 | 0.00210 | -0.02165 | 0.00843 | 0.00000 |
| 2 | -1.00031 | 0.11360 | -0.29575 | 0.67087 | -0.84836 | 0.71002 | -0.42319 | 0.12329 | 0.00000 |
| 3 | -26.35191 | 0.32788 | -1.42068 | 3.02860 | -4.05324 | 3.57335 | -1.74615 | 0.34157 | 0.00000 |
| 4 | -77.98197 | 0.06830 | -0.85466 | 2.51790 | -4.34468 | 5.15078 | -3.62889 | 1.25408 | 0.00000 |
| 5 | -4.95954 | 0.27897 | -1.80954 | 6.94192 | -17.83559 | 28.10749 | -24.69361 | 9.05872 | 0.00000 |
| 6 | 2.28070 | 0.01658 | 0.11859 | -0.54969 | 1.22692 | -1.63490 | 1.37002 | -0.54318 | 0.00000 |
| 7 | 15.08778 | -0.21228 | 0.63935 | -1.69169 | 3.18550 | -3.92292 | 2.95080 | -1.02333 | 0.00000 |
| 8 | 0.19553 | -0.20003 | 0.51136 | -0.84113 | 1.15840 | -1.29282 | 1.02204 | -0.38673 | 0.00000 |
| 9 | 15.53149 | -0.05366 | -0.04030 | -0.06811 | 0.39381 | -0.60741 | 0.58256 | -0.29345 | 0.04291 |
| 10 | -3.40224 | -0.17982 | 0.28872 | -1.26914 | 3.42583 | -5.20636 | 4.49437 | -1.99930 | 0.35241 |
| 11 | -22786.905 | -0.79176 | 0.65390 | -0.22086 | 0.08382 | -0.23932 | 0.25882 | -0.10918 | 0.01623 |
| 12 | -4.42198 | -0.48006 | 0.65579 | -0.64007 | 0.42333 | -0.18452 | 0.04968 | -0.00742 | 0.00047 |

FIG. 20

| SIXTH EMBODIMENT ||||||
|---|---|---|---|---|---|
| f = | 2.11 | F number = | 1.90 | θ = | 47.70 |

| SURFACE NO. | | RADIUS OF CURVATURE | THICKNESS/ DISTANCE | FOCAL LENGTH | REFRACTIVE INDEX | ABBE NUMBER |
|---|---|---|---|---|---|---|
| 1 | FIRST LENS | -2.4780 | 0.3460 | -2.125 | 1.544 | 56.090 |
| 2 | | 2.2930 | 0.0340 | | | |
| 3 | SECOND LENS (STOP) | 1.7400 | 0.2610 | 2.111 | 1.589 | 61.250 |
| 4 | | -4.1760 | 0.0300 | | | |
| 5 | THIRD LENS | 2.7580 | 0.5850 | 1.758 | 1.544 | 56.090 |
| 6 | | -1.3640 | 0.1120 | | | |
| 7 | FOURTH LENS | 12.8050 | 0.3090 | -2.086 | 1.685 | 31.210 |
| 8 | | 1.2810 | 0.2710 | | | |
| 9 | FIFTH LENS | -4.1970 | 0.7720 | 1.454 | 1.544 | 56.090 |
| 10 | | -0.7110 | 0.2960 | | | |
| 11 | SIXTH LENS | -3.2590 | 0.3500 | -1.694 | 1.544 | 56.090 |
| 12 | | 1.3420 | 0.2270 | | | |
| 13 | FILTER | infinity | 0.1100 | | 1.517 | 64.200 |
| 14 | | infinity | 0.3170 | | | |
| 15 | IMAGING PLANE | infinity | -0.0100 | | | |

FIG. 23

| SIXTH EMBODIMENT | K | A | B | C | D | E | F | G | H |
|---|---|---|---|---|---|---|---|---|---|
| 1 | -2.37435 | -0.10891 | 0.58672 | -1.64628 | 2.90268 | -2.84562 | 1.17741 | 0.00000 | |
| 2 | -99.00000 | -0.21976 | -2.74914 | 36.92964 | -192.20840 | 537.60090 | -792.73520 | 479.39270 | |
| 3 | -75.45238 | 0.36458 | -9.17290 | 75.93924 | -350.05520 | 931.70230 | -1350.483 | 816.79890 | |
| 4 | 31.51946 | -0.19479 | 1.59546 | -4.11039 | 1.97360 | 12.87295 | -33.21564 | 27.69013 | |
| 5 | -3.46758 | -0.17534 | 2.21859 | -10.43024 | 27.72031 | -45.89245 | 43.12948 | -17.69480 | |
| 6 | 1.37626 | 0.01594 | 0.10617 | 1.11378 | -5.89415 | 13.74833 | -15.61738 | 7.26051 | |
| 7 | -8.45355 | -0.55078 | 1.25679 | -4.01109 | 9.06905 | -12.31047 | 9.49755 | -3.17394 | |
| 8 | -1.60428 | -0.36803 | 0.85855 | -1.85541 | 2.95936 | -2.96193 | 1.64901 | -0.38967 | |
| 9 | 8.63756 | 0.02673 | 0.54014 | -1.31773 | 2.13598 | -2.01699 | 1.01293 | -0.20961 | |
| 10 | -3.36816 | -0.23915 | 0.42214 | -0.89181 | 1.49287 | -1.53939 | 0.96219 | -0.25280 | |
| 11 | 1.731 | 0.55999 | -1.32392 | 1.55722 | -1.09075 | 0.45876 | -0.10536 | 0.01008 | |
| 12 | -1.49278 | -0.12627 | -0.10509 | 0.16223 | -0.10322 | 0.03474 | -0.00585 | 0.00038 | |

FIG. 24

OPTICAL IMAGING SYSTEM

CROSS-REFERENCE TO RELATED APPLICATION

This application is a Divisional under 35 USC § 121 of U.S. application Ser. No. 15/187,918 filed on Jun. 21, 2016, which claims the benefit under 35 USC § 119(a) of Korean Patent Application No. 10-2015-0145260 filed on Oct. 19, 2015, in the Korean Intellectual Property Office, the entire disclosures of each of which are incorporated herein by reference for all purposes.

BACKGROUND

1. Field

The following description relates to an optical imaging system including lenses.

2. Description of Related Art

A plurality of optical imaging systems may be mounted in a portable terminal. For example, optical imaging systems may be mounted on each of a front surface and a rear surface of the portable terminal.

The optical imaging system mounted on the rear surface of the portable terminal may be used to image a subject located at a relatively long distance. On the other hand, the optical imaging system mounted on the front surface of the portable terminal is used to image a subject located at a relatively short distance. However, the optical imaging system mounted on the front surface of the portable terminal may generate an optical distortion phenomenon, such as "cone-head." Therefore, there is a need to develop an optical imaging system capable of reducing optical distortions, such as "cone-head" distortions, and being appropriate for imaging a subject at a relatively short distance.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided an optical imaging system, including: a first lens including a negative refractive power and a concave object-side surface; a second lens including a concave object-side surface; a third lens; a fourth lens including a negative refractive power; a fifth lens; and a sixth lens including an inflection point formed on an image-side surface thereof, wherein the first to sixth lenses are sequentially disposed from an object side toward an imaging plane.

The second lens may include a positive refractive power.
The third lens may include a positive refractive power.
The fifth lens may include a positive refractive power.
The sixth lens may include a negative refractive power.
$-35.0 < \{(1/f)*(Y/\tan \theta)-1\}*100 < -5.0$, in which f may be an overall focal length of the optical imaging system, Y may be ½ of a diagonal length of the imaging plane, and θ may be equal to half a field of view of the optical imaging system.

$TL/2Y < 0.95$, in which TL may be a distance from the object-side surface of the first lens to the imaging plane, and 2Y may be a diagonal length of the imaging plane.

$R1/f < -0.5$, in which f may be an overall focal length of the optical imaging system, and R1 may be a radius of curvature of the object-side surface of the first lens.

$-5.5 < (R1+R2)/(R1-R2) < 0.5$, in which R1 may be a radius of curvature of the object-side surface of the first lens, and R2 may be a radius of curvature of an image-side surface of the first lens.

$-1.5 < f/f1 < -0.05$, in which f may be an overall focal length of the optical imaging system, and f1 may be a focal length of the first lens.

$0.5 < f/f3 < 2.0$, in which f may be an overall focal length of the optical imaging system, and f3 may be a focal length of the third lens.

$0.7 < |f/f6| < 1.8$, in which f may be an overall focal length of the optical imaging system, and f6 may be a focal length of the sixth lens.

$1.5 < f/EPD < 2.1$, in which f may be an overall focal length of the optical imaging system, and EPD may be an entrance pupil diameter of the optical imaging system.

$0.4 < (t1+t2)/t3 < 1.3$, in which t1 may be a thickness at an optical axis center of the first lens, t2 may be a thickness at an optical axis center of the second lens, and t3 may be a thickness at an optical axis center of the third lens.

$0 < |n1-n2| < 0.25$, in which n1 may be a refractive index of the first lens, and n2 may be a refractive index of the second lens.

In accordance with an embodiment, there is provided an optical imaging system, including: a first lens including a concave object-side surface; a second lens including a convex image-side surface; a third lens having including a convex object-side surface and a convex image-side surface; a fourth lens; a fifth lens; and a sixth lens including an inflection point formed on an image-side surface thereof, wherein the first to sixth lenses are sequentially disposed from an object side toward an imaging plane.

In accordance with another embodiment, there is provided an optical imaging system, including: a first lens including a concave image-side surface and a concave image-side surface; a second lens including a concave image-side surface and a convex image-side surface; a third lens including a convex object-side surface and a convex image-side surface; a fourth lens; a fifth lens; and a sixth lens including a concave image-side surface, wherein the first, the fourth, and the sixth lenses have a same refractive power, different than a refractive power of the third and fourth lenses.

The first, the second, the fourth, and the sixth lenses may include a negative refractive power.

The second, the third, and the fourth lenses may include a positive refractive power.

The fourth lens may include a meniscus shape and the fifth lens may include a concave object-side surface and a convex image-side surface.

Other features and aspects will be apparent from the following detailed description, the drawings, and the claims.

BRIEF DESCRIPTION OF DRAWINGS

These and/or other aspects will become apparent and more readily appreciated from the following description of the embodiments, taken in conjunction with the accompanying drawings in which:

FIG. 3 is a table displaying characteristics of lenses of the optical imaging system illustrated in FIG. 1;

FIG. 4 is a table displaying aspherical characteristics of the optical imaging system illustrated in FIG. 1;

FIG. 7 is a table displaying characteristics of lenses of the optical imaging system illustrated in FIG. 5;

FIG. 8 is a table displaying aspherical characteristics of the optical imaging system illustrated in FIG. 5;

FIG. 11 is a table displaying characteristics of lenses of the optical imaging system illustrated in FIG. 9;

FIG. 12 is a table displaying aspherical characteristics of the optical imaging system illustrated in FIG. 9;

FIG. 15 is a table displaying characteristics of lenses of the optical imaging system illustrated in FIG. 13;

FIG. 16 is a table displaying aspherical characteristics of the optical imaging system illustrated in FIG. 13;

FIG. 19 is a table displaying characteristics of lenses of the optical imaging system illustrated in FIG. 17;

FIG. 20 is a table displaying aspherical characteristics of the optical imaging system illustrated in FIG. 17;

FIG. 23 is a table displaying characteristics of lenses of the optical imaging system illustrated in FIG. 21; and FIG. 24 is a table displaying aspherical characteristics of the optical imaging system illustrated in FIG. 21.

Figure 1:
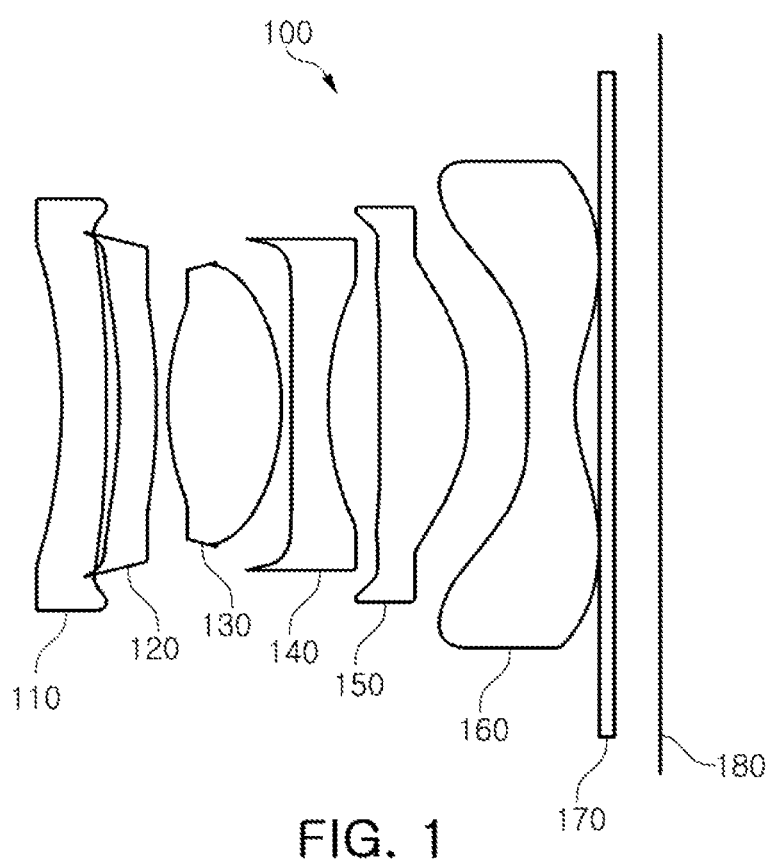
FIG. 1 is a view of an optical imaging system, according to a first embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing particular embodiments only and is not intended to be limiting. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, various embodiments will be described with reference to schematic views illustrating embodiments. In the drawings, for example, due to manufacturing techniques and/or tolerances, modifications of the shape shown may be estimated. Thus, embodiments should not be construed as being limited to the particular shapes of regions shown herein, for example, to include a change in shape results in manufacturing. The following embodiments may also be constituted by one or a combination thereof.

The various embodiments described below may have a variety of configurations and propose only a required configuration herein, but are not limited thereto.

In addition, a surface of each lens closest to an object is referred to as a first surface or an object-side surface, and a surface of each lens closest to an imaging surface is referred to as a second surface or an image-side surface. A person skilled in the relevant art will appreciate that other units of measurement may be used. Further, in the present specification, all radii of curvature, thicknesses, OALs (optical axis distances from the first surface of the first lens to the image sensor (OALs), a distance on the optical axis between the stop and the image sensor (SLs), a through-the-lens (TTL), image heights or ½ of a diagonal length of the imaging plane (IMGHs) (image heights), and black focus lengths (BFLs) (back focus lengths) of the lenses, an overall focal length of an optical system, and a focal length of each lens are indicated in millimeters (mm). Further, thicknesses of lenses, gaps between the lenses, OALs, and SLs are distances measured based on an optical axis of the lenses.

Further, in a description for shapes of the lenses, surface of a lens being convex means that an optical axis portion of a corresponding surface is convex, and a surface of a lens being concave means that an optical axis portion of a corresponding surface is concave. Therefore, even in the case that one surface of a lens is described as being convex, an edge portion of the lens may be concave. Likewise, even in the case that one surface of a lens is described as being concave, an edge portion of the lens may be convex. In other words, a paraxial region of a lens may be convex, while the remaining portion of the lens outside the paraxial region is either convex, concave, or flat. Further, a paraxial region of a lens may be concave, while the remaining portion of the lens outside the paraxial region is either convex, concave, or flat.

In the optical system, according to embodiments, the first to fifth lenses are formed of materials including glass, plastic or other similar types of polycarbonate materials. In another embodiment, at least one of the first through fifth lenses is formed of a material different from the materials forming the other first through fifth lenses.

An optical imaging system includes an optical system including lenses. For example, the optical system of the optical imaging system may include five lenses having refractive power. However, the optical imaging system is not limited to including only the lenses having the refractive power. For example, the optical imaging system may include a stop to control an amount of light. In addition, the optical imaging system may further include an infrared cut-off filter filtering infrared light. Further, the optical imaging system may further include an image sensor, such as an imaging device, configured to convert an image of a subject incident thereto through the optical system into electrical signals. Further, the optical imaging system may further include a gap maintaining member adjusting a gap between lenses.

First to sixth lenses are formed of materials having a refractive index different from that of air. For example, the first to sixth lenses are formed of plastic or glass. At least one of the first to sixth lenses has an aspherical shape. As one example, only the sixth lens of the first to sixth lenses may have the aspherical shape. In addition, at least one surface of all of the first to sixth lenses is aspherical. In an example, the aspherical surface of each lens may be represented by the following Equation 1:

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}$$ [Equation 1]

In this equation, c is an inverse of a radius of curvature of the lens, k is a conic constant, r is a distance from a certain point on an aspherical surface of the lens to an optical axis, A to J are aspherical constants, and Z (or SAG) is a distance between a certain point on the aspherical surface of the lens at the distance Y and a tangential plane meeting the apex of the aspherical surface of the lens.

In accordance with an embodiment, an optical imaging system includes six lenses, a filter, an image sensor, and a stop. Next, the above-mentioned components will be described.

The first lens has a refractive power. For example, the first lens has a negative refractive power.

At least one surface of the first lens is concave. For example, an object-side surface of the first lens is concave. In one example, an image-side surface of the first lens is concave in a paraxial region and gradually outwardly curves (such as inflection points), at edge portions thereof. An object-side surface of the first lens is concave in the paraxial region and gradually flattens at edge or end portions of the first lens.

The first lens has an aspherical surface. For example, both surfaces of the first lens are aspherical. The first lens is formed of a material having high light transmissivity and excellent workability. For example, the first lens is formed of plastic. However, a material of the first lens is not limited to plastic. For example, the first lens may be formed of glass.

The second lens has a refractive power. For example, the second lens has a positive refractive power or a negative refractive power.

At least one surface of the second lens is convex. For example, an image-side surface of the second lens is convex. In this example, an object-side surface of the second lens is concave in a paraxial region. In another embodiment, an image-side surface of the second lens is concave and the object-side surface of the second lens is convex. In one embodiment, end portions of the object-side surface of the second lens overlaps, at least in part, with at least a portion of the first lens. In another embodiment, the second lens is spaced apart from the first lens.

The second lens has an aspherical surface. For example, an object-side surface of the second lens is aspherical. The second lens is formed of a material having high light transmissivity and excellent workability. For example, the second lens is formed of plastic. However, a material of the second lens is not limited to the plastic. For example, the second lens is formed of glass.

The third lens has a refractive power. For example, the third lens has a positive refractive power.

At least one surface of the third lens is convex. For example, both surfaces of the third lens is convex. In one example, an object-side surface of the third lens is convex in a paraxial region and gradually flattens or substantially flattens at edge portions thereof. An image-side surface of the second lens is convex, encompassing an entire image-side surface thereof.

The third lens has an aspherical surface. For example, an image-side surface of the third lens is aspherical. The third lens is formed of a material having high light transmissivity and excellent workability. For example, the third lens is formed of plastic. However, a material of the third lens is not limited to the plastic. For example, the third lens may be formed of glass.

The fourth lens has a refractive power. For example, the fourth lens has a negative refractive power.

The fourth lens has a meniscus shape. For example, an object-side surface of the fourth lens is convex and an image-side surface of the fourth lens is concave. In an alternative embodiment, the object-side surface of the fourth lens is convex in a paraxial region and the image-side surface of the fourth lens is concave. In a further embodiment, the object-side surface of the fourth lens is flat or substantially flat in a paraxial region and the image-side surface of the fourth lens is concave. In one embodiment, the third lens and the fourth lens are spaced apart. In another embodiment, the third lens and the fourth lens are in contact with each other.

The fourth lens has an aspherical surface. For example, both surfaces of the fourth lens is aspherical. The fourth lens is formed of a material having high light transmissivity and excellent workability. For example, the fourth lens is formed of plastic. However, a material of the fourth lens is not limited to the plastic. For example, the fourth lens may be formed of glass.

The fifth lens has a refractive power. For example, the fifth lens has a positive refractive power.

At least one surface of the fifth lens is convex. For example, an image-side surface of the fifth lens is convex. In one example, an object-side surface of the fifth lens is concave in a paraxial region and gradually flattens or substantially flattens at portions thereof and outwardly extends at an angle at end portions thereof. An image-side surface of the second lens is convex in a paraxial region and flattens or substantially flattens at end portions thereof. In another example, the object-side surface of the fifth lens is convex in a paraxial region and gradually flattens or substantially flattens at portions thereof and outwardly extends at an angle at end portions thereof, and the image-side surface of the second lens is convex in a paraxial region and flattens or substantially flattens at end portions thereof.

The fifth lens has an aspherical surface. For example, both surfaces of the fifth lens are aspherical. The fifth lens is formed of a material having high light transmissivity and excellent workability. For example, the fifth lens is formed of plastic. However, a material of the fifth lens is not limited to the plastic. For example, the fifth lens is formed of glass.

The sixth lens has a refractive power. For example, the sixth lens has a negative refractive power.

The sixth lens has a meniscus shape. For example, an image-side surface of the sixth lens is concave. In an example, an object-side surface of the sixth lens is concave in a paraxial region.

The sixth lens has inflection points. For example, the inflection points may be formed on both surfaces of the sixth lens.

The sixth lens has an aspherical surface. For example, both surfaces of the sixth lens are aspherical. The sixth lens is formed of a material having high light transmissivity and excellent workability. For example, the sixth lens is formed of plastic. However, a material of the sixth lens is not limited to the plastic. For example, the sixth lens may be formed of glass.

A person of ordinary skill in the relevant art will appreciate that each of the first through sixth lenses may be configured in an opposite refractive power from the configuration described above. For example, in an alternative configuration, the first lens has a positive refractive power, the second lens has a positive refractive power, the third lens has a negative refractive power, the fourth lens has a positive refractive power, the fifth lens has a negative refractive power, and the sixth lens has a positive refractive power. Other variations of the refractive power for the above-described embodiment may be implemented.

The filter filters certain wavelengths of light from incident light incident through the first to sixth lenses. For example, the filter filters infrared wavelengths of the incident light.

The filter is manufactured to have a relatively thin thickness. To this end, the filter is formed of plastic.

The image sensor is configured to realize a high degree of resolution. For example, a unit size of the pixels configuring the image sensor may be 1.12 μm or less.

The stop is disposed in order to adjust an amount of light incident to the lenses. For example, the stop is disposed or adjacently disposed between the second and third lenses. However, a person skilled in the art will appreciate that the stop may be placed at other positions, such as in front of the first lens, and more than one stop may be implemented.

The optical imaging system satisfies the following Conditional Expressions 1 through 11:

$-35.0 < \{(1/f)*(Y/\tan\theta)-1\}*100 < -5.0$ [Conditional Expression 1]

$TL/2Y < 0.95$ [Conditional Expression 2]

$R1/f < -0.5$ [Conditional Expression 3]

$-5.5 < (R1+R2)/(R1-R2) < 0.5$ [Conditional Expression 4]

$-1.5 < f/f1 < -0.05$ [Conditional Expression 5]

$0.5 < f/f3 < 2.0$ [Conditional Expression 6]

$0.7 < |f/f6| < 1.8$ [Conditional Expression 7]

$0.9 < \tan\theta$ [Conditional Expression 8]

$1.5 < f/EPD < 2.1$ [Conditional Expression 9]

$0.4 < (t1+t2)/t3 < 1.3$ [Conditional Expression 10]

$0 < |n1-n2| < 0.25.$ [Conditional Expression 11]

In an example, f is an overall focal length of the optical imaging system, 2Y is a diagonal length of an imaging plane, Y is ½ of 2Y, θ is equal to half a field of view of the optical imaging system, R1 is a radius of curvature of the object-side surface of the first lens, R2 is a radius of curvature of an image-side surface of the first lens, f1 is a focal length of the first lens, f3 is a focal length of the third lens, f6 is a focal length of the sixth lens, EPD is an entrance pupil diameter (EPD), t1 is a thickness at an optical axis center of the first lens, t2 is a thickness at an optical axis center of the second lens, t3 is a thickness at an optical axis center of the third lens, n1 is a refractive index of the first lens, and n2 is a refractive index of the second lens.

The optical imaging system satisfying the above Conditional Expressions 1 through 11 may be miniaturized, and may allow high resolution images to be realized.

Next, optical imaging systems, according to several embodiments, will be described.

An optical imaging system, according to a first embodiment, will be described with reference to FIG. 1.

The optical imaging system 100, according to the first embodiment, includes an optical system including a first lens 110, a second lens 120, a third lens 130, a fourth lens 140, a fifth lens 150, and a sixth lens 160.

The optical imaging system 100 includes a filter 170, an image sensor 180, and a stop ST. The filter 170 is disposed between the sixth lens 160 and the image sensor 180, and the stop ST is disposed between the second lens 120 and the third lens 130.

In an embodiment, the first lens 110 has a negative refractive power, and an object-side surface thereof is concave and an image-side surface thereof may be convex. The second lens 120 has a positive refractive power, and an object-side surface thereof is concave and an image-side surface thereof is convex. The third lens 130 has a positive refractive power, and an object-side surface and an image-side surface thereof are convex. The fourth lens 140 has a negative refractive power, and an object-side surface thereof is convex and an image-side surface thereof is concave. The fifth lens 150 has a positive refractive power, and an object-side surface thereof is convex and an image-side surface thereof is convex. The sixth lens 160 has a negative refractive power, and an object-side surface thereof is convex and an image-side surface thereof is concave. In addition, inflection points are formed on both surfaces of the sixth lens 160.

Figure 2:
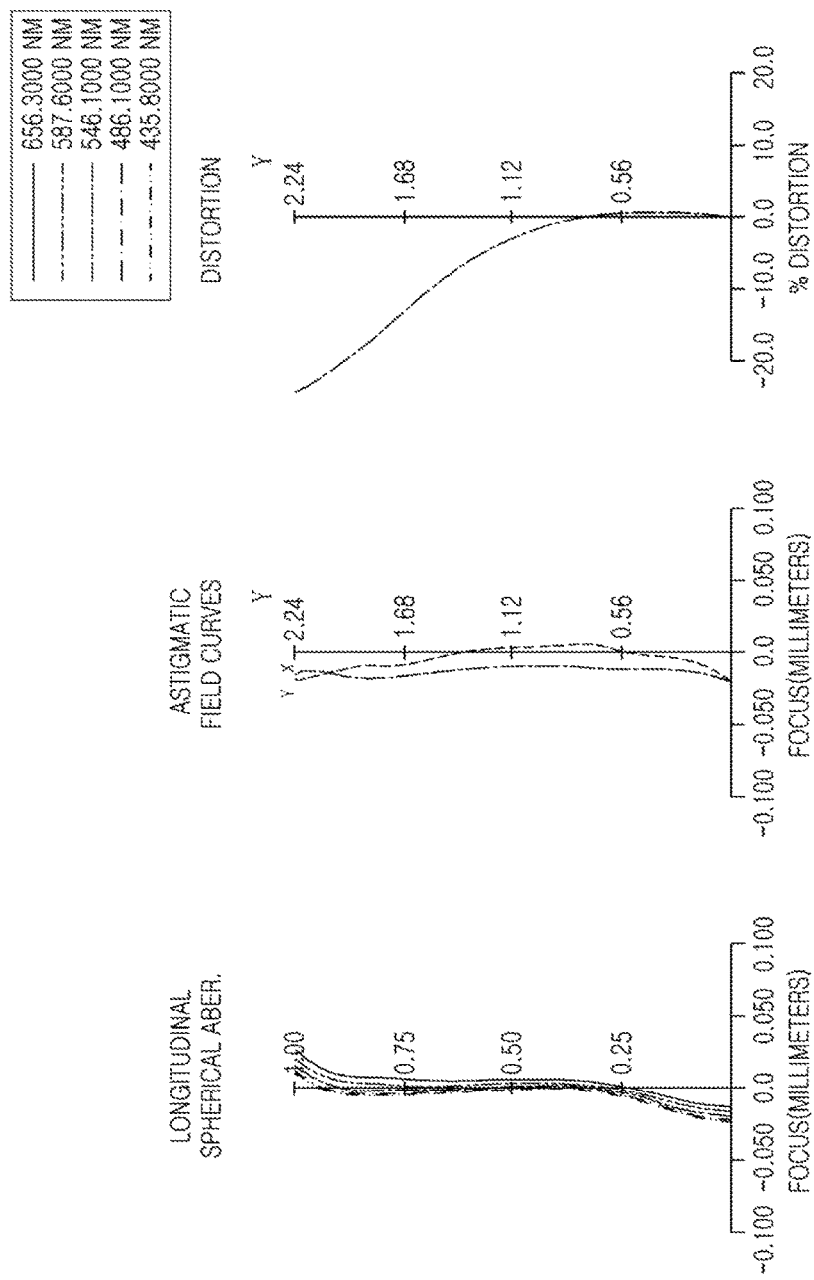
FIG. 2 is graphs displaying aberration curves of the optical imaging system illustrated in FIG. 1.

The optical imaging system configured as described above may represent aberration characteristics as illustrated in FIG. 2. FIGS. 3 and 4 are tables displaying characteristics of lenses and aspherical characteristics of the optical imaging system, according to the first embodiment.

Figure 5:
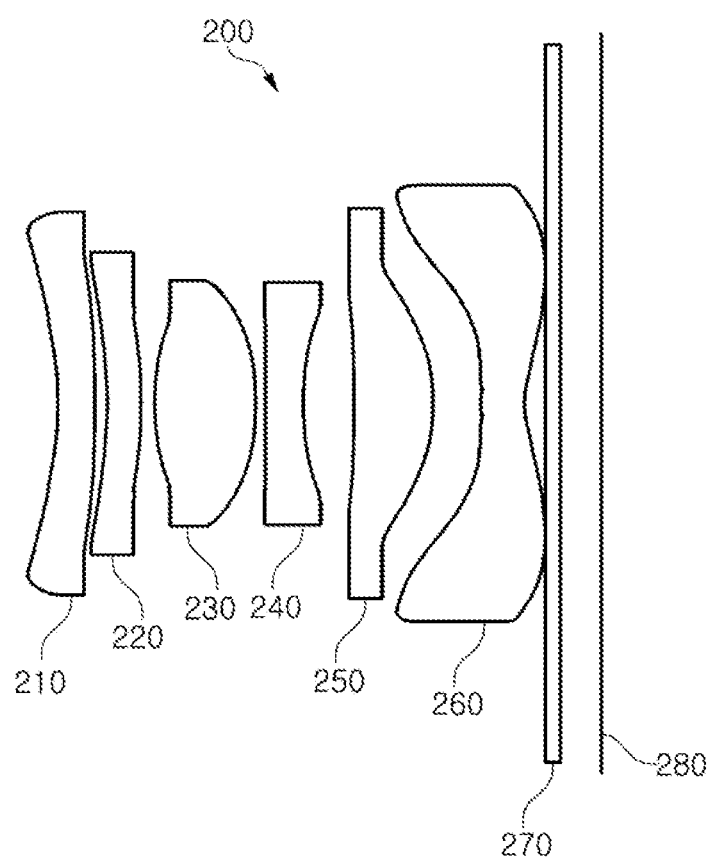
FIG. 5 is a view of an optical imaging system, according to a second embodiment.

An optical imaging system, according to a second embodiment, will be described with reference to FIG. 5.

The optical imaging system 200, according to the second embodiment, includes an optical system including a first lens 210, a second lens 220, a third lens 230, a fourth lens 240, a fifth lens 250, and a sixth lens 260.

The optical imaging system 200 includes a filter 270, an image sensor 280, and a stop ST. The filter 270 is disposed between the sixth lens 260 and the image sensor 280, and the stop ST is disposed between the second lens 220 and the third lens 230.

In an embodiment, the first lens 210 has a negative refractive power, and an object-side surface thereof is concave and an image-side surface thereof may be convex. The second lens 220 has a negative refractive power, and an object-side surface thereof is concave and an image-side surface thereof is convex. The third lens 230 has a positive refractive power, and an object-side surface and an image-side surface thereof are convex. The fourth lens 240 has a negative refractive power, and an object-side surface thereof is convex and an image-side surface thereof is concave. The fifth lens 250 has a positive refractive power, and an object-side surface thereof is concave and an image-side surface thereof is convex. The sixth lens 260 has a negative refractive power, and an object-side surface thereof is convex and an image-side surface thereof is concave. In addition, inflection points are formed on both surfaces of the sixth lens 260.

Figure 6:
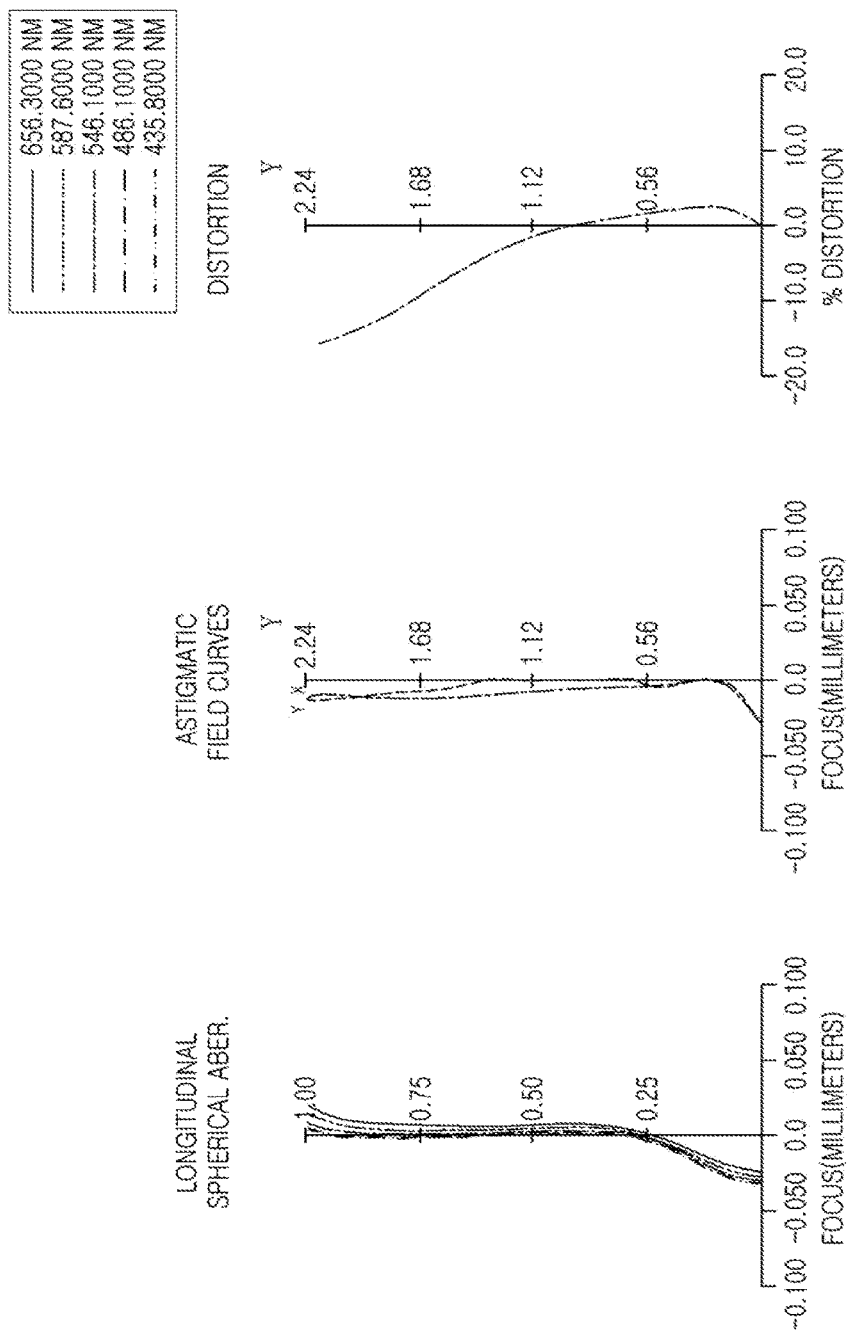
FIG. 6 is graphs displaying aberration curves of the optical imaging system illustrated in FIG. 5.

The optical imaging system configured as described above may represent aberration characteristics as illustrated in FIG. 6. FIGS. 7 and 8 are tables displaying characteristics of lenses and aspherical characteristics of the optical imaging system, according to the second embodiment.

Figure 9:
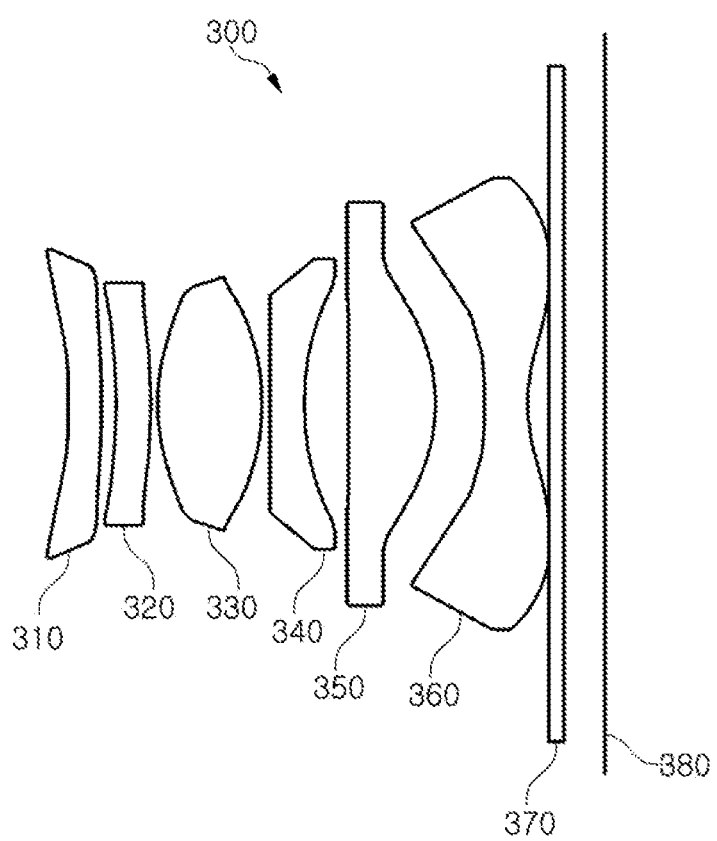
FIG. 9 is a view of an optical imaging system, according to a third embodiment.

An optical imaging system, according to a third embodiment, will be described with reference to FIG. 9.

The optical imaging system 300, according to the third embodiment, includes an optical system including a first lens 310, a second lens 320, a third lens 330, a fourth lens 340, a fifth lens 350, and a sixth lens 360.

The optical imaging system 300 includes a filter 370, an image sensor 380, and a stop ST. The filter 370 is disposed between the sixth lens 360 and the image sensor 380, and the stop ST is disposed between the second lens 320 and the third lens 330.

In an embodiment, the first lens 310 has a negative refractive power, and an object-side surface thereof is concave and an image-side surface thereof may be convex. The second lens 320 has a negative refractive power, and an object-side surface thereof is concave and an image-side surface thereof is convex. The third lens 330 has a positive refractive power, and an object-side surface and an image-side surface thereof are convex. The fourth lens 340 has a negative refractive power, and an object-side surface thereof is convex and an image-side surface thereof is concave. The fifth lens 350 has a positive refractive power, and an object-side surface thereof is concave and an image-side surface thereof is convex. The sixth lens 360 has a negative refractive power, and an object-side surface thereof is convex and an image-side surface thereof is concave. In addition, inflection points are formed on both surfaces of the sixth lens 360.

Figure 10:
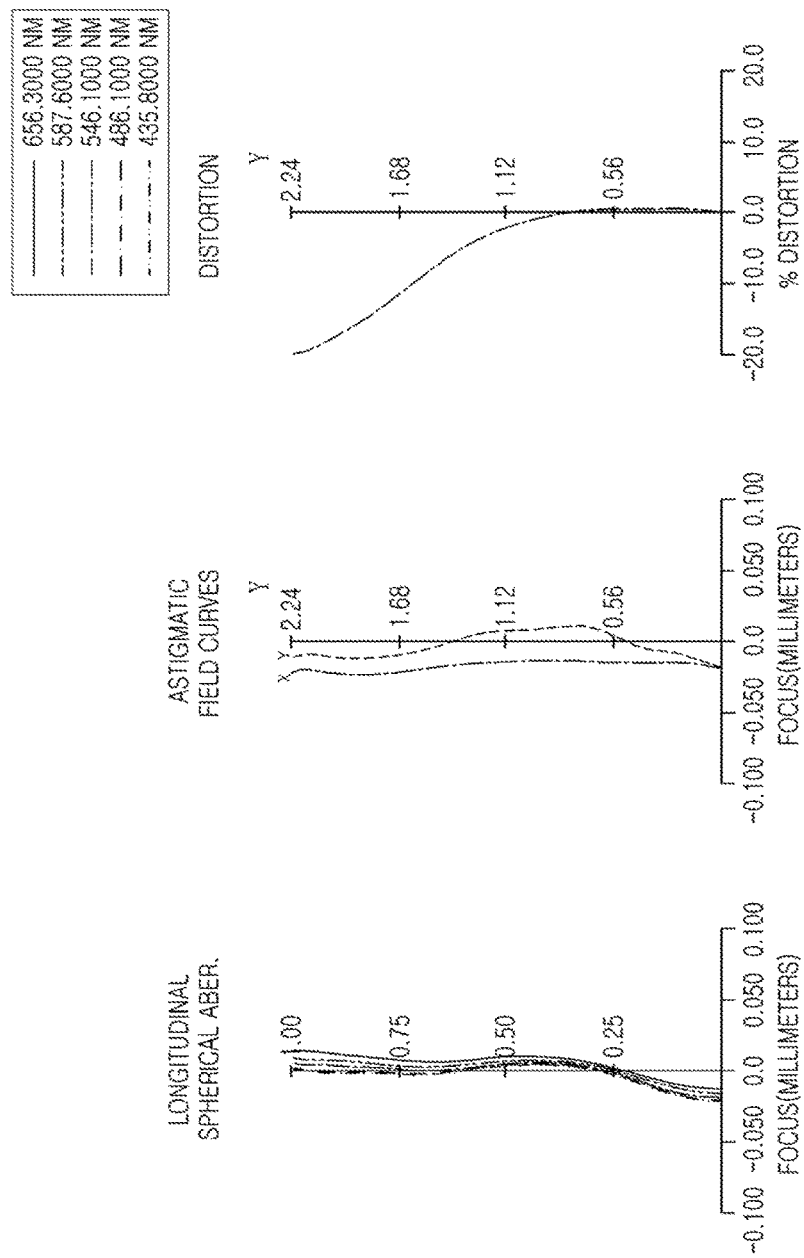
FIG. 10 is graphs displaying aberration curves of the optical imaging system illustrated in FIG. 9.

The optical imaging system configured as described above may represent aberration characteristics as illustrated in FIG. 10. FIGS. 11 and 12 are tables displaying characteristics of lenses and aspherical characteristics of the optical imaging system, according to the third embodiment.

Figure 13:
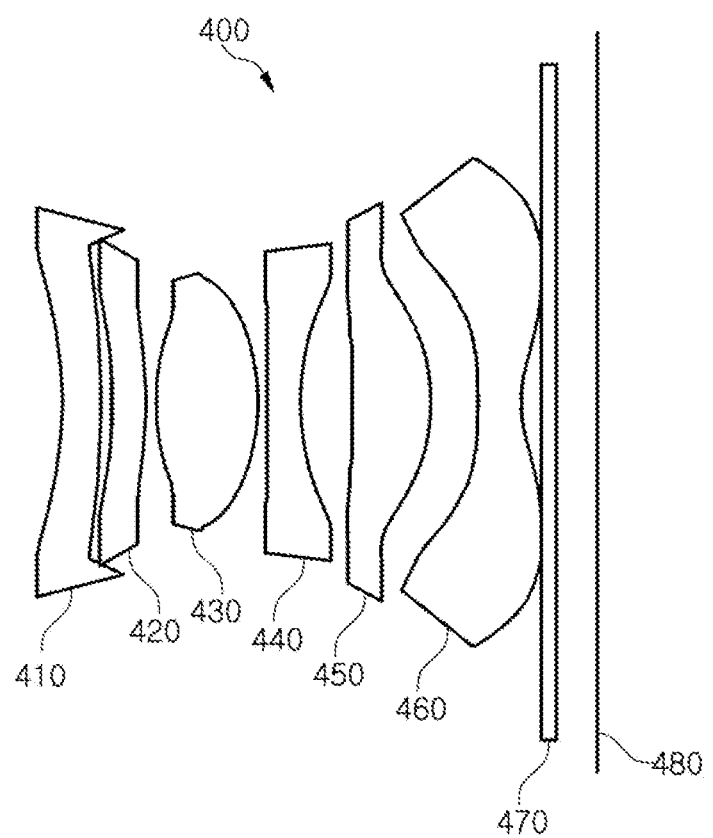
FIG. 13 is a view of an optical imaging system, according to a fourth embodiment.

An optical imaging system, according to a fourth embodiment, will be described with reference to FIG. 13.

The optical imaging system 400, according to the fourth embodiment, includes an optical system including a first lens 410, a second lens 420, a third lens 430, a fourth lens 440, a fifth lens 450, and a sixth lens 460.

The optical imaging system 400 includes a filter 470, an image sensor 480, and a stop ST. The filter 470 is disposed between the sixth lens 460 and the image sensor 480, and the stop ST is disposed between the second lens 420 and the third lens 430.

In an embodiment, the first lens 410 has a negative refractive power, and an object-side surface thereof is concave and an image-side surface thereof is convex. The second lens 420 has a negative refractive power, and an object-side surface thereof is concave and an image-side surface thereof is convex. The image-side surface of the first lens 410 and the object-side surface of the second lens 420, in one embodiment, touch or overlap at a point or portions thereof. The third lens 430 has a positive refractive power, and an object-side surface and an image-side surface thereof are convex. The fourth lens 440 has a negative refractive power, and an object-side surface thereof is convex and an image-side surface thereof is concave. The fifth lens 450 has a positive refractive power, and an object-side surface thereof is convex and an image-side surface thereof is convex. The sixth lens 460 has a negative refractive power, and an object-side surface thereof is convex and an image-side surface thereof is concave. In addition, inflection points are formed on both surfaces of the sixth lens 460.

Figure 14:
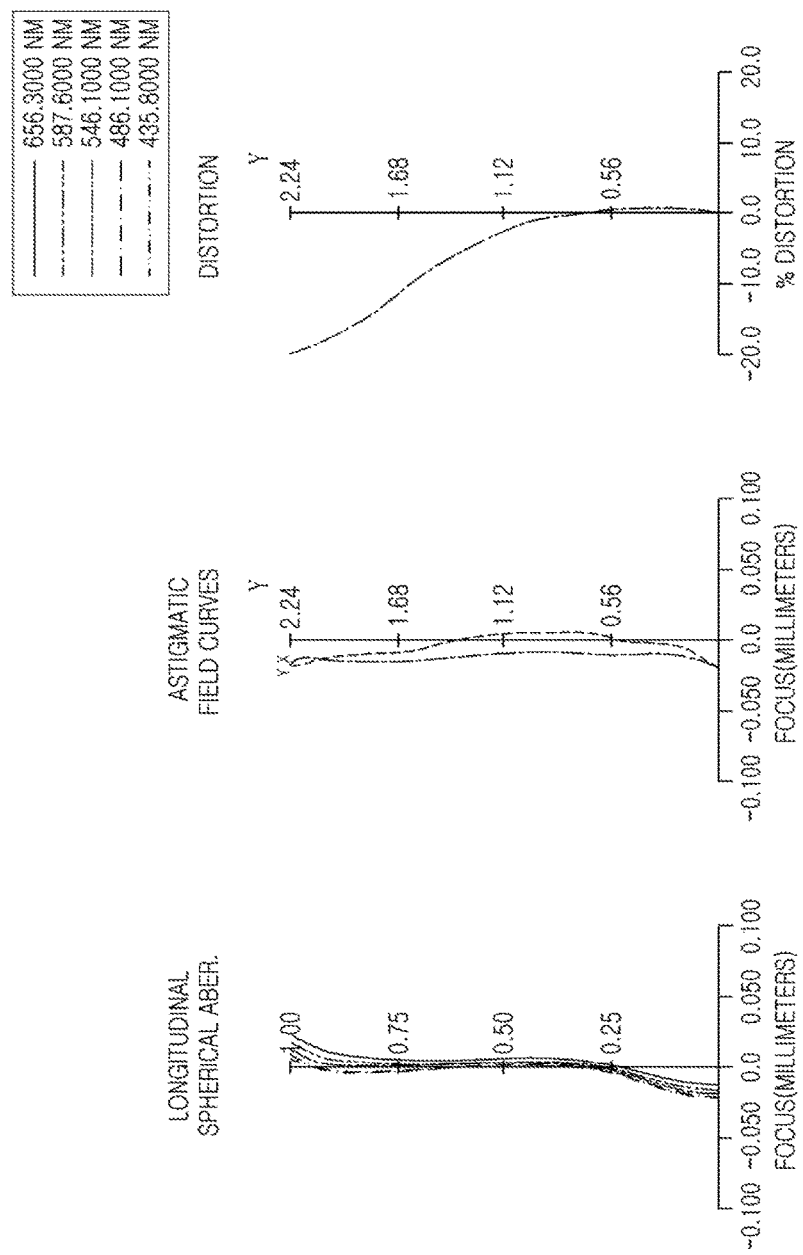
FIG. 14 is graphs displaying aberration curves of the optical imaging system illustrated in FIG. 13.

The optical imaging system configured as described above may represent aberration characteristics as illustrated in FIG. 14. FIGS. 15 and 16 are tables displaying characteristics of lenses and aspherical characteristics of the optical imaging system, according to the fourth embodiment.

Figure 17:
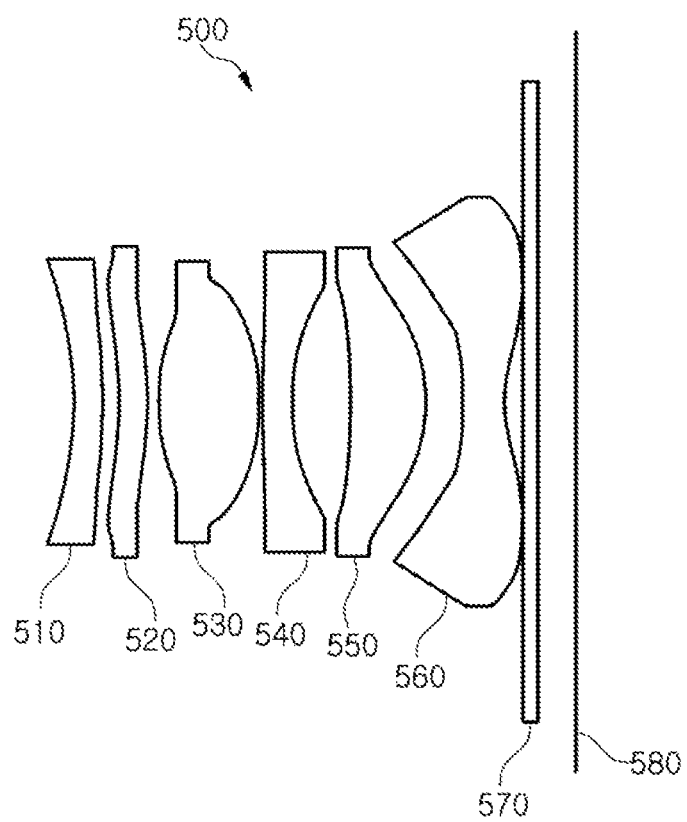
FIG. 17 is a view of an optical imaging system, according to a fifth embodiment.

An optical imaging system, according to a fifth embodiment, will be described with reference to FIG. 17.

The optical imaging system 500, according to the fifth embodiment, includes an optical system including a first lens 510, a second lens 520, a third lens 530, a fourth lens 540, a fifth lens 550, and a sixth lens 560.

The optical imaging system 500 includes a filter 570, an image sensor 580, and a stop ST. The filter 570 is disposed between the sixth lens 560 and the image sensor 580, and the stop ST is disposed between the second lens 520 and the third lens 530.

In an embodiment, the first lens 510 has a negative refractive power, and an object-side surface thereof is concave and an image-side surface thereof is convex. The second lens 520 has a negative refractive power, and an object-side surface thereof is concave and an image-side surface thereof is convex. The third lens 530 has a positive refractive power, and an object-side surface and an image-side surface thereof are convex. The fourth lens 540 has a negative refractive power, and an object-side surface thereof is convex and an image-side surface thereof is concave. The fifth lens 550 has a positive refractive power, and an object-side surface thereof is concave and an image-side surface thereof is convex. The sixth lens 560 has a negative refractive power, and an object-side surface thereof is convex and an image-side surface thereof is concave. In addition, inflection points are formed on both surfaces of the sixth lens 560.

Figure 18:
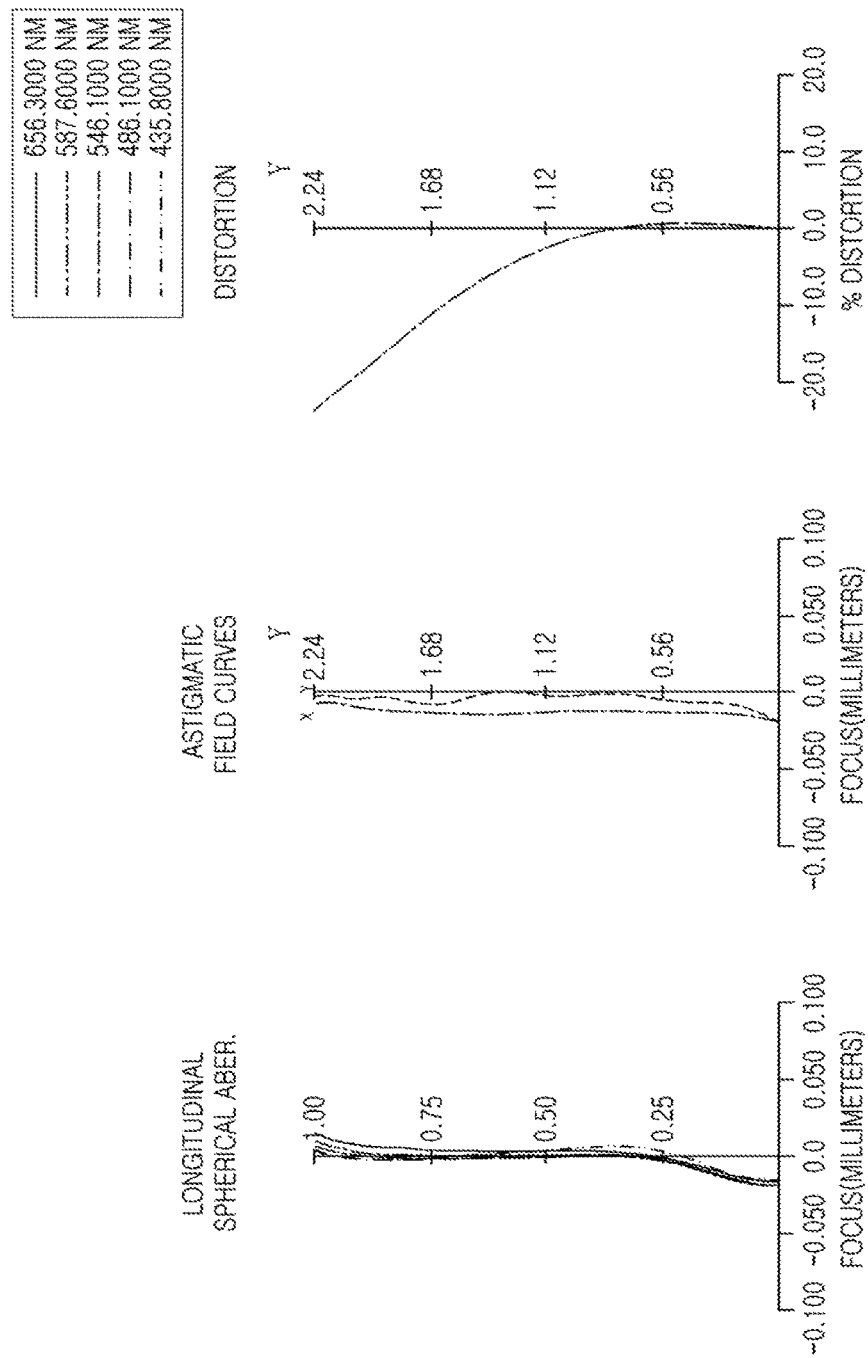
FIG. 18 is graphs displaying aberration curves of the optical imaging system illustrated in FIG. 17.

The optical imaging system configured as described above may represent aberration characteristics as illustrated in FIG. 18. FIGS. 19 and 20 are tables displaying characteristics of lenses and aspherical characteristics of the optical imaging system, according to the fifth embodiment.

Figure 21:
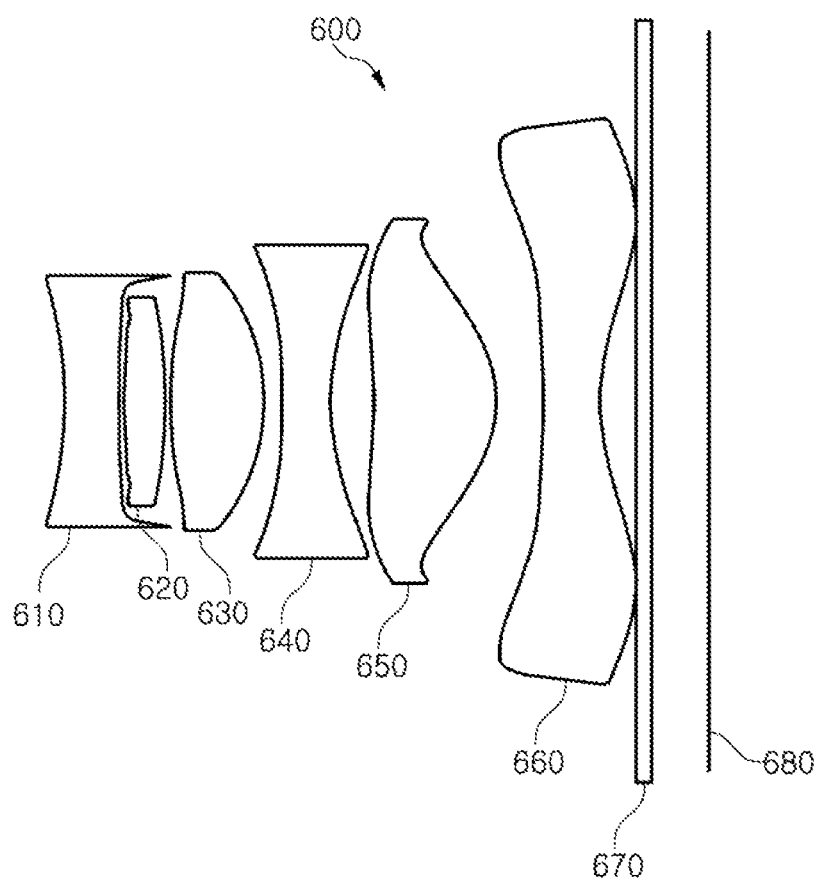
FIG. 21 is a view of an optical imaging system, according to a sixth embodiment.

An optical imaging system, according to a sixth embodiment, will be described with reference to FIG. 21.

The optical imaging system 600, according to the sixth embodiment, includes an optical system including a first lens 610, a second lens 620, a third lens 630, a fourth lens 640, a fifth lens 650, and a sixth lens 660.

The optical imaging system 600 includes a filter 670, an image sensor 680, and a stop ST. The filter 670 is disposed between the sixth lens 660 and the image sensor 680, and the stop ST is disposed between the second lens 620 and the third lens 630.

In an embodiment, the first lens 610 has a negative refractive power, and an object-side surface thereof is concave and an image-side surface thereof is concave. The second lens 620 may have positive refractive power, and an object-side surface and an image-side surface thereof are convex. The third lens 630 has a positive refractive power, and an object-side surface and an image-side surface thereof are convex. The fourth lens 640 has a negative refractive power, and an object-side surface thereof is convex and an image-side surface thereof is concave. The fifth lens 650 has a positive refractive power, and an object-side surface thereof is concave and an image-side surface thereof is convex. The sixth lens 660 has a negative refractive power, and an object-side surface thereof is concave and an image-side surface thereof is concave. In addition, inflection points are formed on both surfaces of the sixth lens 660.

Figure 22:
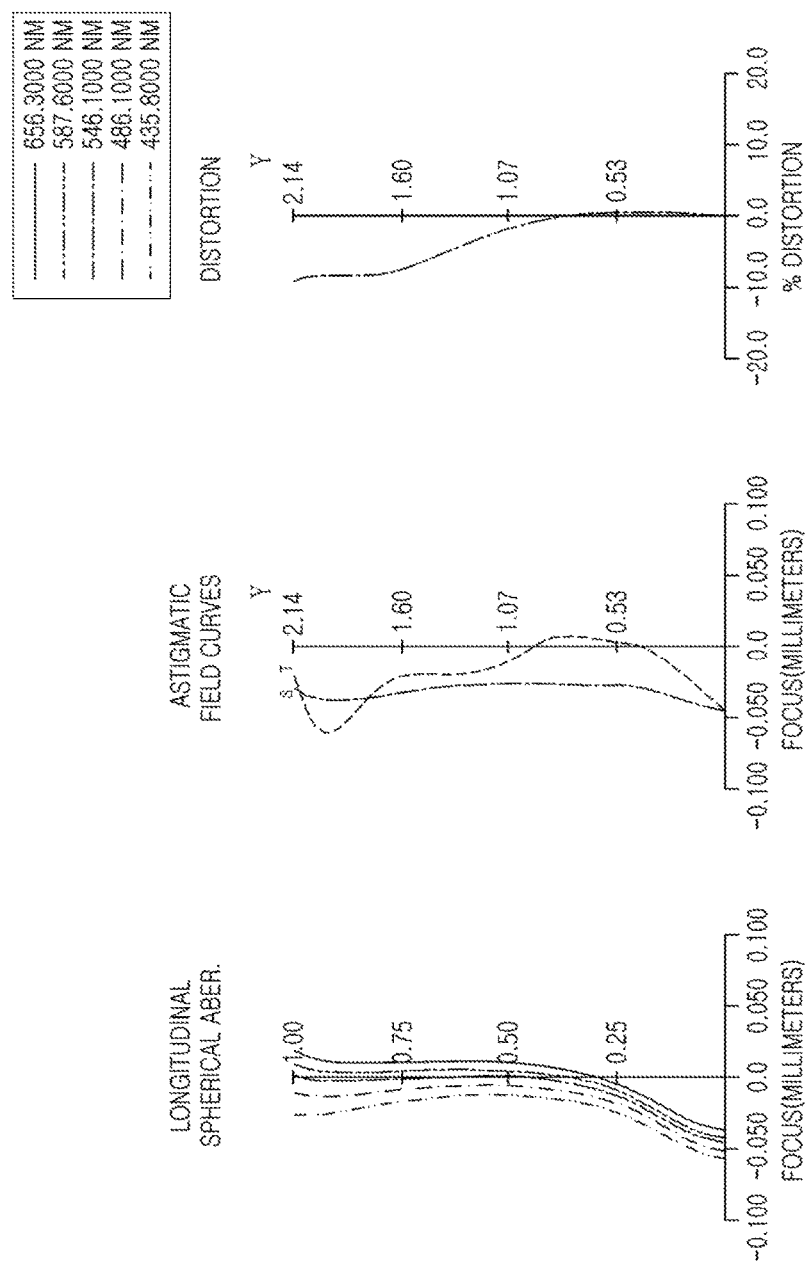
FIG. 22 is graphs displaying aberration curves of the optical imaging system illustrated in FIG. 21.

The optical imaging system, configured as described above, may represent aberration characteristics as illustrated in FIG. 22. FIGS. 23 and 24 are tables displaying characteristics of lenses and aspherical characteristics of the optical imaging system, according to the sixth embodiment.

Table 1 represents values of Conditional Expressions 1 through 11 of the optical imaging systems, according to the first to sixth embodiments.

TABLE 1

| Conditional Expression | First Embodiment | Second Embodiment | Third Embodiment | Fourth Embodiment | Fifth Embodiment | Sixth Embodiment |
|---|---|---|---|---|---|---|
| $\{(1/f)*(Y/\tan\theta) - 1\}*100$ | −24.00 | −16.15 | −20.04 | −19.99 | −24.00 | −9.11 |
| TL/2Y | 0.900 | 0.910 | 0.900 | 0.900 | 0.890 | 0.950 |
| R1/f | −1.360 | −1.360 | −1.440 | −1.330 | −1.250 | −1.170 |
| (R1 + R2)/(R1 − R2) | −3.430 | −3.870 | −3.350 | −3.880 | −4.510 | 0.040 |
| f/f1 | −0.170 | −0.160 | −0.170 | −0.160 | −0.150 | −0.990 |
| f/f3 | 1.330 | 1.340 | 1.330 | 1.330 | 1.410 | 1.200 |
| |f/f6| | 1.140 | 1.150 | 1.100 | 1.170 | 1.180 | 1.250 |
| tanθ | 1.299 | 1.175 | 1.322 | 1.271 | 1.087 | 1.099 |
| f/EPD | 1.850 | 1.870 | 1.850 | 1.850 | 1.830 | 1.900 |
| (t1 + t2)/t3 | 0.721 | 0.714 | 0.648 | 0.719 | 0.582 | 1.038 |
| |n1 − n2| | 0.099 | 0.107 | 0.107 | 0.099 | 0.099 | 0.045 |

As set forth above, according to various embodiments, the optical imaging system that reduces a wide angle distortion phenomenon may be realized.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system, comprising:
   a first lens comprising a concave object-side surface;
   a second lens comprising a convex image-side surface;
   a third lens comprising a convex object-side surface and a convex image-side surface;
   a fourth lens comprising a convex object-side surface;
   a fifth lens; and
   a sixth lens comprising an inflection point formed on an image-side surface thereof,
   wherein the first to sixth lenses are sequentially disposed from an object side toward an imaging plane.

2. The optical imaging system of claim 1, wherein 0.7<|f/f6|<1.8, in which f is an overall focal length of the optical imaging system, and f6 is a focal length of the sixth lens.

3. The optical imaging system of claim 1, wherein 1.5<f/EPD<2.1, in which f is an overall focal length of the optical imaging system, and EPD is an entrance pupil diameter of the optical imaging system.

4. The optical imaging system of claim 1, wherein 0.4<(t1+t2)/t3<1.3, in which t1 is a thickness at an optical axis center of the first lens, t2 is a thickness at an optical axis center of the second lens, and t3 is a thickness at an optical axis center of the third lens.

5. The optical imaging system of claim 1, wherein 0<|n1−n2|<0.25, in which n1 is a refractive index of the first lens, and n2 is a refractive index of the second lens.

6. An optical imaging system, comprising:
a first lens comprising a concave image-side surface;
a second lens comprising a convex image-side surface;
a third lens comprising a convex object-side surface and a convex image-side surface;
a fourth lens comprising a convex object-side surface;
a fifth lens; and
a sixth lens comprising a concave image-side surface,
wherein the first, the fourth, and the sixth lenses have a same refractive power, different than a refractive power of the third and fifth lenses.

7. The optical imaging system of claim 6, wherein the first, the fourth, and the sixth lenses comprise a negative refractive power.

8. The optical imaging system of claim 6, wherein the second, the third, and the fifth lenses comprise a positive refractive power.

9. The optical imaging system of claim 6, wherein the fourth lens comprises a concave image-side surface and the fifth lens comprises a concave object-side surface and a convex image-side surface.

10. The optical imaging system of claim 6, wherein $-35.0 < \{(1/f)*(Y/\tan\theta)-1\}*100 < -5.0$, in which f is an overall focal length of the optical imaging system, Y is ½ of a diagonal length of an imaging plane, and $\theta$ is equal to half a field of view of the optical imaging system.

11. The optical imaging system of claim 6, wherein $TL/2Y < 0.95$, in which TL is a distance from an object-side surface of the first lens to an imaging plane, and 2Y is a diagonal length of the imaging plane.

12. The optical imaging system of claim 6, wherein $R1/f < -0.5$, in which f is an overall focal length of the optical imaging system, and R1 is a radius of curvature of an object-side surface of the first lens.

13. The optical imaging system of claim 6, wherein $-5.5 < (R1+R2)/(R1-R2) < 0.5$, in which R1 is a radius of curvature of an object-side surface of the first lens, and R2 is a radius of curvature of the image-side surface of the first lens.

14. The optical imaging system of claim 6, wherein $-1.5 < f/f1 < -0.05$, in which f is an overall focal length of the optical imaging system, and f1 is a focal length of the first lens.

15. The optical imaging system of claim 6, wherein $0.5 < f/f3 < 2.0$, in which f is an overall focal length of the optical imaging system, and f3 is a focal length of the third lens.

* * * * *